United States Patent [19]

Crimmins

[11] Patent Number: 4,757,553

[45] Date of Patent: Jul. 12, 1988

[54] COMMUNICATION SYSTEM WITH PORTABLE UNIT

[76] Inventor: James W. Crimmins, 15 Nutmeg La., Wilton, Conn. 06897

[21] Appl. No.: 619,803

[22] Filed: Jun. 12, 1984

Related U.S. Application Data

[63] Continuation-in-part of Ser. No. 610,421, May 15, 1984.

[51] Int. Cl.[4] ............................................. H04B 9/00
[52] U.S. Cl. .................................... 455/607; 379/56; 455/608
[58] Field of Search ............... 455/607, 608, 606, 617, 455/69, 73; 370/3; 179/2 EA, 170 NC, 170 G; 379/56

[56] References Cited

U.S. PATENT DOCUMENTS

| | | | |
|---|---|---|---|
| 2,404,696 | 7/1946 | Deal | 455/607 |
| 3,732,496 | 5/1973 | Boyer | 455/73 |
| 4,399,564 | 8/1983 | Cowen | 455/608 |
| 4,402,090 | 8/1983 | Gfeller et al. | 455/617 |
| 4,410,878 | 10/1983 | Stach | 455/608 |
| 4,495,648 | 1/1985 | Giger | 455/73 |
| 4,536,624 | 8/1985 | Lyle | 179/170 NC |

FOREIGN PATENT DOCUMENTS

2823931 12/1979 Fed. Rep. of Germany ...... 455/606

Primary Examiner—Joseph A. Orsino, Jr.
Attorney, Agent, or Firm—St. Onge Steward Johnston & Reens

[57] ABSTRACT

An optimized full duplex light wave communication system having a base unit and a portable unit. Two continuously operative channels exist between the base and portable units for two way communication at frequencies selected to minimize interference despite the presence of light within the environment of use at both frequencies. In addition, photo emitters and sensors are specifically configured in an assembly to minimize cross talk between sensors and emitters. A closed loop is formed around the two communication channels that it is operative to regulate the intensity of illumination received at the base photo sensors to a constant level that provides quality audio communications and minimizes portable unit battery drain. The closed loop additionally causes base station transmitter frequency tracking of any center frequency variation in the portable unit receiver.

17 Claims, 4 Drawing Sheets

Fig. 7

COMMUNICATION SYSTEM WITH PORTABLE UNIT

RELATED APPLICATION

This application is a continuation-in-part of my copending application Ser. No. 610,421, filed May 15, 1984.

FIELD AND BACKGROUND OF THE INVENTION

The present invention relates to portable communication systems, and in particular systems intended to provide remote or portable communication through a network such as the telephone line.

Even when remote or portable telephone access is provided, some degree of privacy is still desired, mitigating against the use of radio wave communication which can broadcast a conversation a great distance. In general, some form of light wave communication, such as infrared radiation, is utilized in order to localize the communication and minimize eavesdropping.

It is additionally desired that such communication operate in a full duplex mode permitting simultaneous transmission and reception at the portable unit as is typical of conventional telephone head sets. These system requirements combine to place certain constraints on such a portable communication system. Battery drain in the portable unit limits its useful life between replacement or recharges. Isolation of the light wave transmit and receive signal paths is necessary so as to avoid interference between the paths. Loss of sensitivity results from detuning of system parameters, and audio feedback due to coupling into the two wire telephone network. A portable hand held unit can suffer from blockage of the light wave signal by head and hair shadowing during use.

Battery drain is a significant problem because in order to ensure adequate signal strength over a wide range, the system must be capable of emitting a high level of modulated light. In most situations, the portable unit will be much closer to the network, not requiring such high emission energies and therefore wasting substantial battery power. The required level of modulated light at the photo receiver input (and therefore, the transmitter power requirement) depends on the maximum acceptable background noise as perceived by the user during conversation pulses.

Because both transmit and receive channels are simultaneously operative, and because the receive photo sensors must be sensitive to very low light levels, a substantial potential for interference results from their proximity to the high level emitted radiation from the portable, or network associated transmitting emitters. The photo sensors at the receiver must be able to discriminate between the locally emitted channel, at many orders of magnitude greater intensity, and the incoming signal to which they are intended to be solely responsive.

For reasons of efficiency narrow band pulse rate modulation is typically utilized for the optical transmit and receive links between the portable unit and the network associated receiving and transmitting equipment. Because of the narrow bandwidth thus utilized, and potential abuse to which the portable unit may be subjected in dropping or other accidents, slight detune of the equipment can produce an apparent loss in sensitivity and inadequacy of the portable unit in operating at distances.

Finally, in order to isolate signals being applied by the system to the telephone network from those being received from the telephone network for transmission to the portable unit, a hybrid coupling scheme must be utilized that effectively isolates these two signal flow paths. Such high isolation coupling systems are typically formulated of multiple passive balancing elements including inductors which are both costly and bulky and generally undesirable in modern light weight communication systems.

BRIEF SUMMARY OF THE INVENTION

In accordance with the teaching of the present invention, a portable light wave full duplex commmunication system is provided, operating in an efficient and highly sensitive manner. the system utilizes specific techniques to overcome all of the problems identified above and thereby produces an efficient utilization of battery energy, provides light wave channel isolation, minimizes the effects of frequency detuning of the communication system, bidirectionally couples ingoing and outgoing audio signals to the telephone network without the use of inductive balancing elements, and provides minimum perceived noise for given light-wave level at the receiver's photo sensor input.

In accordance with the present invention, both a portable and a base unit are provided in communication with each other via infrared light waves. The base unit includes a receiver responsive at a first frequency to signals transmitted by a portable unit transmitter with the received signals applied to the telephone network through a coupling system with an inductorless balancing network utilizing duals of inductive circuits to accomplish the function of conventional inductive couplers. The base unit also includes a transmitter responsive to signals coupled from the telephone network for light wave transmission at a second frequency to a receiver located within the portable unit.

Both channels are operated simultaneously, providing duplex operation. In order to provide a high level of separation between channels and thus prevent interference or cross talk, the frequency ratios are in the square root of two in order to maximize the separation between the channels and all possible harmonics. In addition, pulse rate modulation is utilized wherein substantially fifty percent duty cycle pulses of well shaped form are utilized in order to minimize the harmonic content in the transmitted radiation. In addition, assemblies for the photo emitters and photo sensors are utilized which prevent the photo sensors from seeing reflection, in the near field, from the photo emitters associated with each of the portable or base units. The photo emitters in the base unit are additionally placed at the bottom of a recess and permitted to radiate in a large solid angle pattern utilizing curved prism optics.

In order to minimize the amount of transmitted power from the portable unit and thereby minimize battery drain, the two communication channels at the two frequencies are operated in a closed loop which maintains the detected modulated radiation level at the base unit receiving photo sensors at a substantially constant level. This level is set to provide fully adequate audio or voice reproduction without requriring unnecessary emission energies when the portable unit is closer or in a more direct transmitting path to the photo sensors in the base unit. The closed loop further includes frequency control over the transmitter at the base unit which continuously adjusts its frequency for optimum or maximum sensitivity of the portable unit receiver. This forces the base unit transmitter to track any slight frequency changes in the receiver unit center frequency resulting from mishandling or dropping of the portable unit.

Each receiver and transmitter include complementary nonlinear sensitivity or gain characteristics which reduce the receiver sensitivity at very low input levels so that the perceived nose during voice pauses is substantially reduced. Gain is restored to a higher level for higher level inputs where the voice or audio input serves to mask the noise.

Two sets of photo emitters and photo sensors are located on the portable unit—one set at each end of the hand set. With this arrangement blockage of the light wave signal is unlikely.

BRIEF DESCRIPTION OF THE DRAWING

These and other features of the present invention are more fully setforth below in the solely exemplary detailed description and accompanying drawing of which.

DETAILED DESCRIPTION

The present invention contemplates a portable communication system typically operative with the telephone network and utilizing duplex light wave communication links between a portable transmitter receiver pair and base station transmitter-receiver pair typically associated with the telephone network. The system is optimized for fidelity of audio reproduction and minimal battery drain, minimal interference between duplex communication channels and provides frequency tracking to compensate for frequency deviations in the portable unit receiving circuitry. Noise insensitivity at low levels is also achieved as well as low susceptibility to light wave blocking.

Figures 1, 2:
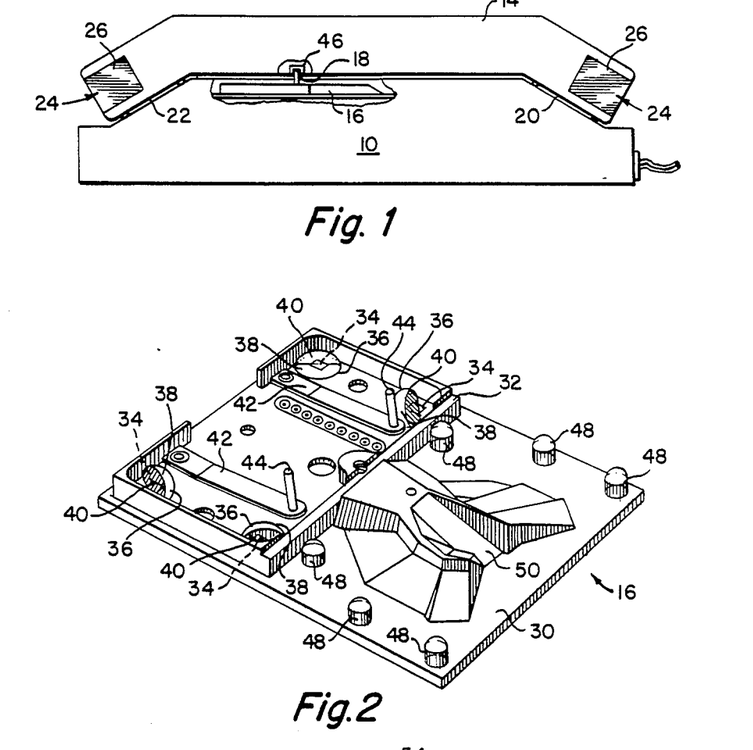
FIG. 1 is a pictorial view of a telephone communication portable hand set and base station.
FIG. 2 is a perspective top view of an assembly for the photo emitting and photo sensing diodes and associated optics of the base station.

A typical unit according to the invention is illustrated in FIG. 1 showing a base unit 10 communicative with the phone lines 12 and cradling a portable or hand set unit 14. The base unit includes a recessed assembly 16 containing photo emitters and photo sensors for use with transmission and receiving circuitry within the base unit 10. A set of pins 18 provide battery charging power to the portable unit 14 and, respond to the weight of the portable unit 14 to disconnect the system from the telephone network 12 as is conventional in telephone equipment.

The hand set 14 includes a speaking portion 20 having a microphone and a listening portion 22 having an ear piece or speaker.

At each end of the portable unit 14 is located an assembly 24 containing photo emitters and photo sensors associated with the transmission and reception circuitry of the portable unit 14 and covered by a primarily infrared transmissive, and therefore dark red, plastic covering 26.

The assembly 16 is illustrated in FIG. 2 to contain typically a printed circuit board 30 on which is located a metallic collar 32 recessed within which at the four interior corners of the collar, are photo sensors 34, typically PIN photo diodes. The diodes 34 are located deep within the recess provided by the collar 32, but are enabled to see into a broad angle above and about the base unit 10 by prisms 36 cemented over the diodes 34. The prisms have partially spherical objective surfaces 38 and reflecting facts 40. Also contained within the collar 32 are contacts 42 and pins 44 which contact corresponding contacts 46 within the portable unit 14 for communicating battery charging power thereto.

The assembly 16 includes, on another portion, an array of photo emitters 48 which are located below the light path from the diodes 34 as shielded partially by the collar 32, but are made to produce infrared modulated radiation through a reflector assembly 50 that reflects light over braod angles from one or more of the light emitting diodes 48. The assembly of FIG. 2 thus provides isolation between photo emission and photo sensing functions.

Figure 3:
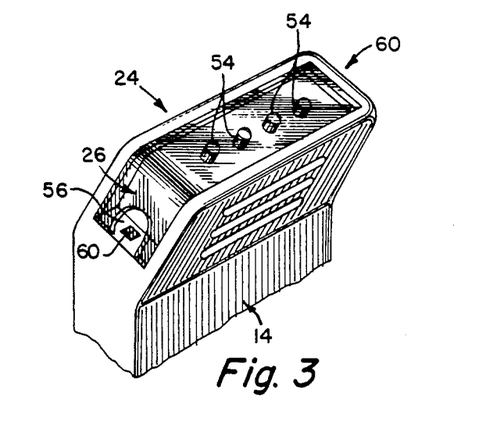
FIG. 3 is an end view of one assembly in a portable unit for housing photo emitters and photo sensors.

FIG. 3 illustrates one of the assemblies 24 for the portable unit 14 containing, on each end thereof, an array typically of four light emitters 54. A side recess 56 on each side has an interior panel 58 and contains a photo sensor 60. The panel 58 prevents the photo sensor 60 from seeing near field radiation from the photo emitters 54 but at the same time permits sensitivity to ambient modulated infrared radiation typically transmitted from the photo emitters 48 in the base unit. The assembly of FIG. 3 appears on both ends of the portable unit affording good light wave access for all modes of handling.

Figure 4:
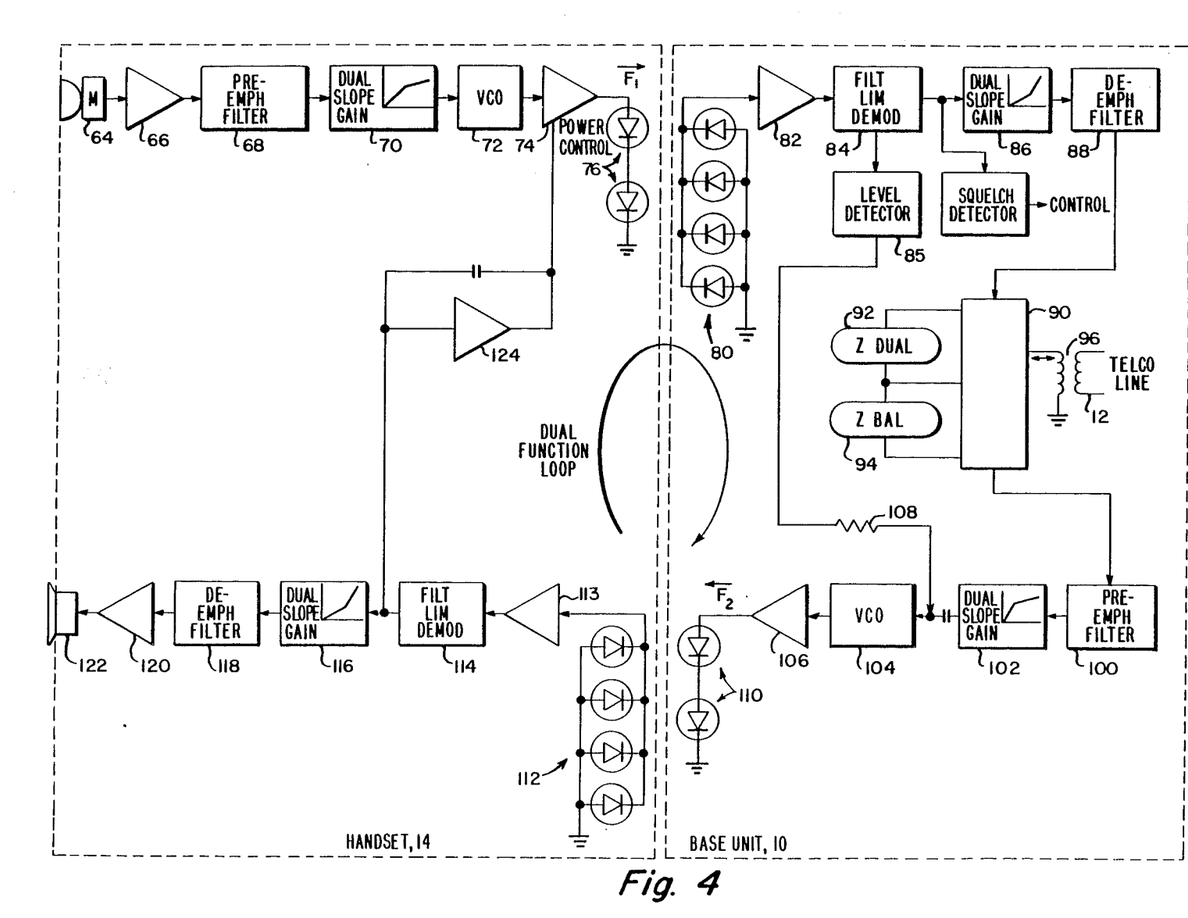
FIG. 4 is a block schematic diagram of the portable communication system of FIG. 1.

With reference to the block diagram of FIG. 4, the complete communication system including both transmitters and receivers for the portable and base units are illustrated. The portable unit, shown to the left in FIG. 4, contains a microphone 64 the output of which is applied to an amplifier 66 for level boosting. The output of the amplifier 66 is applied through a filter 68 which provides frequency pre-emphasis that effects a high frequency rolloff for subsequent pulse rate (FM) modulation. The output of the pre-emphasis fitler 68 is applied to a dual slope gain module having an output level versus input level transfer function as illustrated in the graph associated with the unit. As can be seen, the gain is nonlinear, increasing significantly at low levels. This permits the receiver to possess an opposite characteristic so that when masking audio signals are not present, the receiver gain is reduced to avoid the appearance of noise.

The output of the dual slope gain system 70 is applied to a voltage controlled oscillator 72 which results in a width modulated pulse repetition rate. This output is applied to an LED driver circuit 74 which generates substantially fifty percent duty cycle pulses to a series of light emitting diodes 76. The power level generated by the driver 74 is controlled by a signal taken from the receiver portion of the portable unit 14.

The receiver in the base unit 10 includes a set of photo sensors 80 responsive to pulse rate and width modulated infrared radiation emitting from the diodes 76. The sensed emission is applied through an amplifier/filter 82 to a integrated circuit module 84 acting as a preamplifier, limiter and FM demodulator. The filter 82 converts the pulse rate modulated signal to an FM signal. The demodulated output from the unit 84 is applied through a dual slope gain circuit 86 having a gain characteristic, nonlinear and complementary to the gain of the dual slope circuit 70 so as to restore a substantially overall linear gain characteristic to the signal provided at its output and reduce low level noise during periods of no modulation. This signal is applied through a de-emphasis filter 88 to restore the normal frequency spectrum, prior to being altered by the pre-emphasis filter 68. The output of the de-emphasis filter is applied through an active hybrid circuit 90, having impedance dual and impedance balancing circuits 92 and 94 explained below. The hybrid coupler 90 applies the received signal to the telephone lines 12 through a simple isolation transformer 96.

The hybrid circuit 90 also receives from the telephone lines 12, via the transformer 96, incoming network signals and separates them from the outgoing signals for application to a base unit transmitter side pre-emphasis filter 100. The output of the pre-emphasis filter 100 is applied through a dual slope gain circuit 102 to a voltage controlled oscillator 104 and in turn an LED IR emitter driver 106. The components 100-106 are substantially the same as those found in the transmitter section of the portable unit 14.

In addition, the demodulator 84 has an output, applied through a level detector 85, representing at a DC level the signal strength received through the diodes 80 at the base unit receiver. This signal strength, will in turn represent the distance between the base unit 10 and the portable unit 14 or other factors affecting the strength of the signal sensed from the emitting portable unit transmitter diodes 76. This DC signal level is applied through a high impedance 108 to the input of the voltage controlled oscillator 104, imparting a current summing effect. The results of the DC signal applied through the resistor 108 is to shift the center frequency of oscillation of the oscillator 104 for purpose of frequency compensation and portable unit output power control as described below.

The output of the LED driver 106 in the base unit 10 activates light emitting diodes 110 to emit infrared, pulse rate modulated radiation which is in turn sensed by photo sensors 112 associated with portable unit 14. The signal resulting from infrared radiation sensed by the diodes 112 is applied through an amplifier 113 to an integrated circuit 114 comprising, like the integrated circuit 84, a filter, limiter and demodulator for providing FM demodulation of the pulse rate modulated signal detected by diodes 112. The output of the demodulator 114 is applied to a dual slope gain circuit 116, having the complementary slope characteristic to the circuit 102 and thereby restoring substantially linear gain characteristics throughout the transmitter receiver channel and reducing low volume nose. The output of the dual slope gain circuit is applied to a de-emphasis filter 118 restoring the original frequency components prior to alteration by the filter 100. The output of the filter 118 is applied through a driver amplifier 122 to an ear piece 122, typically associated with the hearing position 22 of the portable unit 14.

The output of the demodulator 114 is also applied through an integrator 124 to the LED driver 74 to control the level of output power and therefore battery drain utilized in activating the infrared diode 76. The feedback from the demodulator 114 to the driver 74 in combination with the feedback from the demodulator 84 through level detector 85 to the voltage controlled oscillator 104 effects a closed loop system, the result of which is to maintain control over the output power in the diodes 76 such that the sensed intensity at the photo sensors 80 remains substantially constant. At the same time, this level affects the frequency of the base unit transmitted radiation center frequency which in turn affects the DC level of the demodulator 114 in such manner that the power output is regulated through frequency variations. Because of the high loop gain, any small frequency deviations in the receiver tune produce an immediate retracking of the frequency of the center band of the oscillator 104. This accommodates any frequency shifting in the center frequency of the demodulator 114 resulting from mishandling of the unit.

Figure 5:
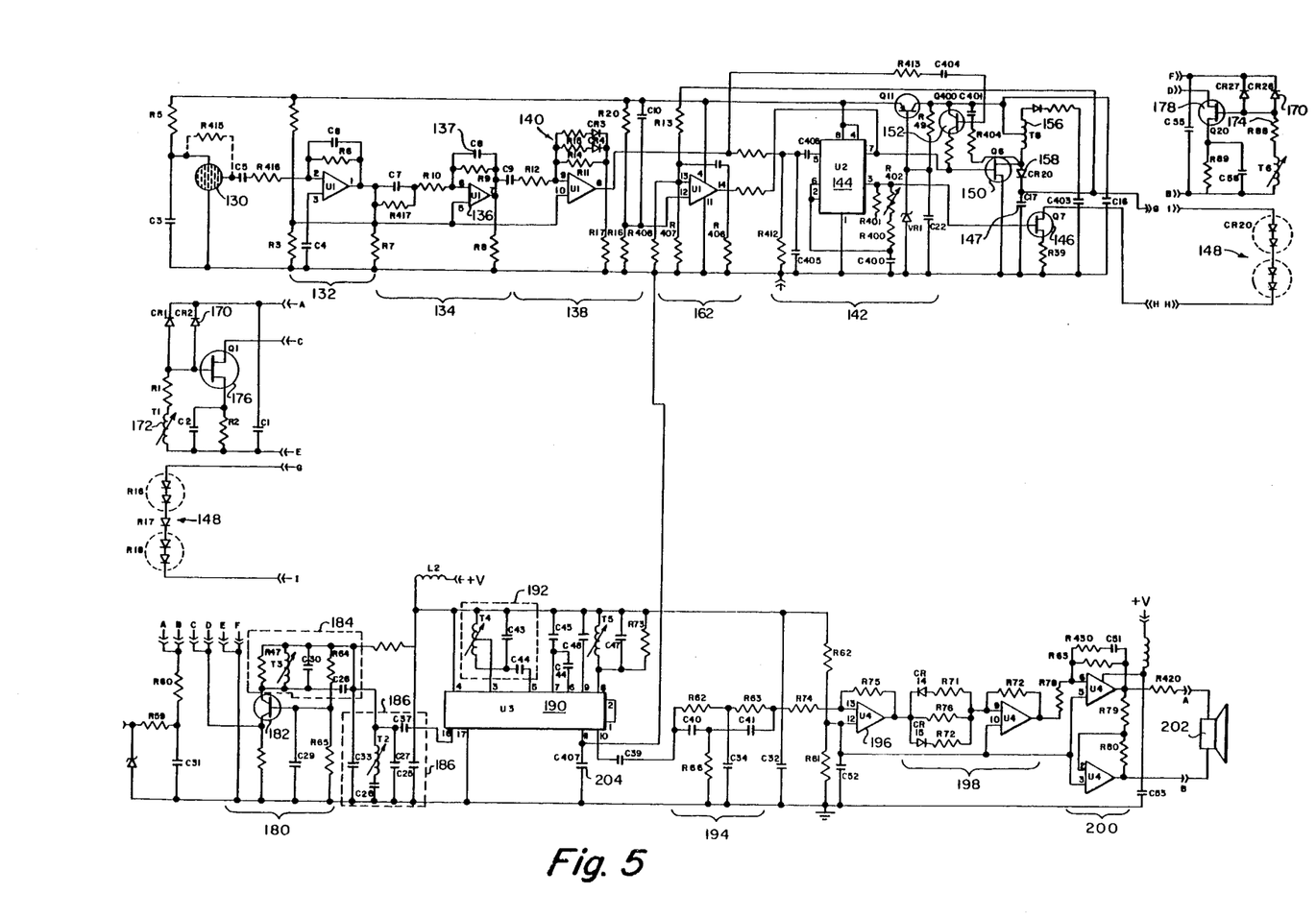
FIG. 5 is a circuit diagram of the portable unit transmit and receive circuitry.

With respect to FIG. 5, circuit details of the present invention are more fully illustrated. As shown there, a microphone 130, suitably biased and frequency compensated, has its audio signal applied through an amplifier 132 to a pre-emphasis circuit 134 having an active FET transistor 136 and feedback capacitor 137 which effect roll off of high frequencies to keep the high frequencies out of the modulator. The output of the pre-emphasis network 134 is applied to a dual slope gain amplifier 138 having a set of feedback diodes 140 the effect of which is to reduce the feedback impedance at high levels and thus effect a form of gain reduction complementary to the receivers low level gain reduction and high level gain increase. The output of the dual slope circuit 138 is applied to a modulator circuit 142 containing an integrated circuit 144, typically a Model 555 timer, integrated circuit operating as a voltage controlled oscillator. The circuit 144 applies an output on a pin 3 to the gate of an FET 146 which controls a discharge path to ground through sets of infrared emitting diodes 148 and 150 at opposite ends of the portable unit, discharging a previously charged capacitor 147. The charge on the capacitor 147 determines the output power as explained below.

The chip 144 functions essentially to produce a triangle wave which, reverses at the levels defined by pins 2 and 8. With the level on 2 determined by the input signal level from the dual slope circuit 138 such that the higher it is the more rapidly the VCO 144 switches, and more frequently the pulses appear on the line from pin 3. At the same time, the output of the loop integrator 162 controls the power driving circuit which charges the capacitor 147 through inductive current pumping by a transistor 150, latched by a transistor 152, to conduct through an inductor 156. With turnon of the transistor 150, the inductor 156 is current loaded and at turnoff dumps the current through diode 158 into the capacitor 147, thereby charging it up to a high voltage level, significantly greater than the driving battery voltage.

The values of the biasing potentials for the circuit 144 are adjusted to provide a substantially fifty percent duty cycle output pulse from pin 3 applied to the transistor 146 which controls the timing of the application of current from the capacitor 147 through the diodes 148. The capacitor discharge matches the LED turnon to yield a square pulse, low in harmonics.

The energy stored in the capacitor 147 governs the output power and is under the control of the output of an integrating amplifier 162 which is driven by the output of the receiving side of the portable unit as described below. The output of the integrator 162 is applied to pin 7, of the circuit 144 and to the gate of the transistor 150 controlling the level of charge application to the capacitor 147. The charge level on the capacitor 147 is fed back to the integrator 162 at a current summing input along with the output from the demodulator in the receiver section. In this manner, a higher input signal from the receiver requires a lower signal from the capacitor 147 and vice versa effecting the power control through the level applied to pin 7. Pin 7 provides a separate switching to ground in unison with the pulse output on pin 3. The greater the output of the integrator 162, representing a more strongly received signal, the shorter is the on time of transistor 150 and the less charge is applied to the capacitor 147.

On the receiver side, two sets of photo diodes 170, one set for each end of the portable unit, are included within networks 172 and 174. The networks include active FET transistors 176 and 178 to provide impedance matching and frequency matching characteristics for the photo diodes. The output of the transistors 176 and 178 are combined in an amplifier stage 180 having a low noise transistor 182, emitter driven by the outputs of the photo sensor FETS. The receiver has a filter section 184 which provides LC tuning to the base unit transmitter frequency. Here the pulse rate modulated signal is converted by means of filtering to an FM signal. The collector output from the transistor 182 is applied through a filter 186, having a zero at the transmitter frequency for the local transmitter, in this case the transmitter in the portable unit. This filtered signal is applied to an integrated circuit 190 functioning as a preamplifier, limiter, and demodulator. The circuit includes a filter 192 which tunes the integrated circuit to a center frequency for the base unit transmitter center frequency.

The output of the demodulator 190 is applied through a "twin T" filter 194 which filters out frequencies at twice the frequency of the local transmitter and applies it through an amplifier 196 to a dual slope amplifier 198 acting with an inverse characteristic, complementary to the dual slope amplifier 138 to restore substantial circuit linearity and effect quieting when low levels of modulation exist. The output of the dual slope circuit 198 drives a bridge audio amplifier 200 through a pair of amplifiers which are connected to opposite sides of an earphone 202.

Figure 6:
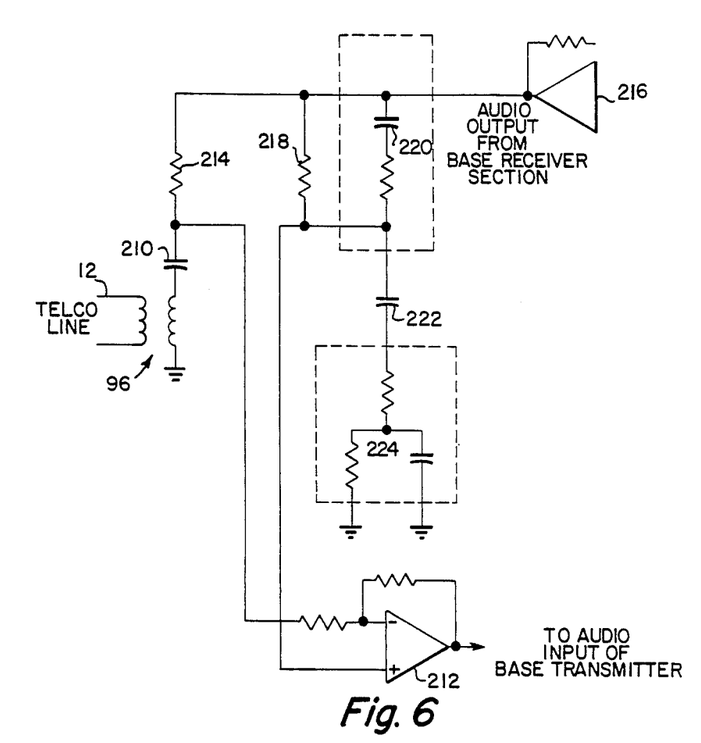
FIG. 6 is a schematic diagram of a hybrid coupling circuit (with inductive duals) associated with the base unit.

The output of the demodulator 190 which represents received signal level, is bypassed through a loop filtering and capacitor 204 and applied to the input of the integrator 162 as the power output control, sensed through frequency deviations. With reference now to FIG. 6, circuitry exemplary of an implementation of the hybrid circuit 90 illustrated in FIG. 4 and associated duals 92 and 94 are illustrated. In particular, the transformer 96 applies a signal through a DC bypass capacitor 210 to a noninverting input of an amplifier 212 having input resistances and feedback resistances which determine the gain characteristics. The output of the amplifier 212 is applied to the pre-emphasis filter 100 in the base station transmitter circuitry. The signal on the high side of the capacitor 210 is also applied through a resistor 214 to the output of an audio amplifier 216 at the output of the receiver side. Across the output of the audio amplifier 216 is a parallel combination of a high impedance resistance 218 with an RC series combination 220. The noninverting input of the amplifier 212 is fed from this parallel circuit and is in turn shunted by a series RC circuit 222 feeding into ground through a parallel RC circuit 224. The combination of the parallel circuit 224 and the resistive component of the series circuit 224 provides the impedance balancing circuitry of FIG. 4 while the combination of the series circuit 220 provides the impedance dual circuit 92 of FIG. 4. By this means an effective balancing impedance which would normally incorporate inductance is created with resistors and capacitors.

Figure 7:
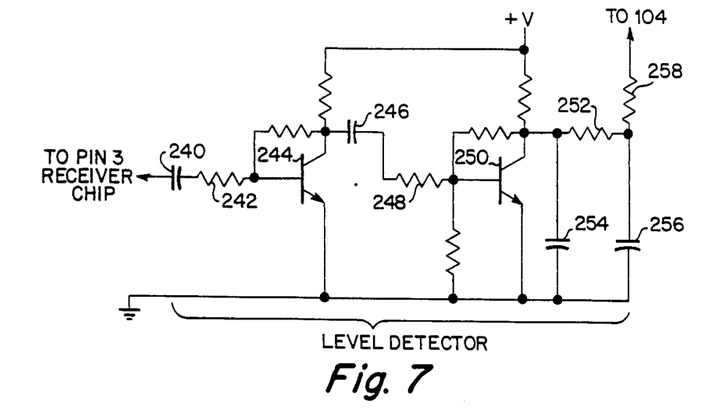
FIG. 7 is a schematic diagram of the level detector utilized in the base unit schematic.

With reference to FIG. 7, the level detector circuit 85 is illustrated. As shown there, the output from pin 3 of the integrated circuit 190 in the base unit receiver section is applied through a coupling capacitor 240, through a resistor 242 to the base of a transistor 244. The amplified output of the collector of the transistor 244 is applied through a coupling capacitor 246 and input resistor 248 to the base of a further transistor 250. The collector output of the transistor 250 is applied through a pi filter comprising a series resistor 252 and shunt capacitors 254 and 256 through a high impedance resistance 258, to give a curent summing characteristic to the signal applied thereby to the voltage controlled oscillator 104. In particular, this signal is applied to pin 5 in the chip 144 as utilized in the base unit transmitter section.

It will be noted that the above described system provides a fully duplex infrared system optimized for battery utilization, frequency separation, and other characteristics. It is to be noted that specific implementations may vary and accordingly the scope of the invention is to be limited only in accordance with the following claims.

What is claimed is:

1. A full duplex, light wave communication system, comprising:
    a base unit having a light transmitter and a light receiver;
    a portable unit having a light transmitter and a light receiver;
    the portable unit light transmitter and base unit light receiver being operative at a first center pulse frequency and having respective light pulse modulated photo emitters and light pulse detecting photo sensors;
    said base unit light transmitter and portable unit light receiver being operative at a second center pulse frequency and having respective light pulse modulated photo emitters and light pulse detecting photo sensors;
    demodulating means in the base unit for demodulating a signal sent from the portable unit to the base unit and for generating a first level signal representative of the light intensity at the photo sensors of the base unit incident from photo emitters in the portable unit transmitter and representative of a change in the first center pulse frequency relative to the center frequency of the portable light receiver;
    means responsive to the first level signal for shifting the second center pulse frequency transmitted by the base unit;
    demodulating means in the portable unit for demodulating a signal sent from the base unit to the portable unit and generate a second level signal representative of the shift of the second center pulse frequency received at the portable unit from the base unit transmitter; and means responsive to the second level signal for controlling the magnitude of light pulses from the portable unit light transmitter so as to maintain the light intensity at the photo sensors of the base unit at a level sufficient for optical communication between the portable unit and the base unit and for reducing the change of the second center pulse frequency.

2. The system of claim 1 and further including means for suppressing interference between the light transmitter-receiver pair operating at said first center pulse frequency and the light transmitter-receiver pair operating at said second center pulse frequency.

3. The system of claim 2 wherein said interference suppressing means includes means for establishing said first and second center pulse frequencies so that the ratio therebetween approximates the square root of two to provide maximum frequency separation between said first and second center pulse frequencies and their harmonics.

4. The system of claim 1 wherein the base unit and portable unit have infrared transmitters and infrared receivers.

5. The system of claim 4 wherein the base unit and portable unit each include means for pulse rate modulating the photo emitters with center pulse frequencies corresponding to the first center pulse frequency in the portable base unit transmitter and the second center pulse frequency in the base unit transmitter.

6. The system of claim 1 and further including:

means associated with each light transmitter for responding to an input modulating signal to provide light pulse rate modulation in accordance with the level thereof;

first nonlinear gain means at each light transmitter for varying the magnitude of the modulation signal in a manner that varies inversely with the level of the input signal; and second nonlinear gain means in each light receiver to provide a transfer characteristic that compensates for the effect of the first nonlinear gain means;

whereby receiver output noise level at low level input signals is substantially reduced while high input signal levels are correctly reproduced at outputs of light receivers.

7. The system of claim 1 wherein said means responsive to the second level signal adjusts the portable unit light transmitter output power so as to maintain a substantially constant detectable light intensity at the base unit.

8. The system of claim 7 wherein said demodulating means in the portable unit detects frequency deviations in the center frequency of the base unit transmitter relative to the portable unit receiver center frequency.

9. The system of claim 7 wherein:

said portable unit receiver includes means for providing detection about a center frequency of photo pulses received from said base unit transmitter and to produce said second level signal indicative of the deviation between the base unit transmitter center frequency and the portable unit receiver center frequency; and wherein said means for controlling the portable unit transmitted light magnitude controls said magnitude as a function of said deviation in center frequencies.

10. A full duplex, light wave communication system, comprising:

a base unit having a light transmitter and a light receiver;

a portable unit having a light transmitter and a light receiver;

the portable unit light transmitter and base unit light receiver being operative at a first center pulse frequency and having respective light pulse modulated photo emitters and light pulse detecting photo sensors;

said base unit light transmitter and portable unit light receiver being operative at a second center pulse frequency and having respective light pulse modulated photo emitters and light pulse detecting photo sensors;

said photo sensors and photo emitters respectively in the portable and base units being mounted in assemblies, with means for isolating photo sensors from sensing near field radiation from a photo emitter associated with the same assembly;

with photo sensors being mounted in a recessed relationship on the same assembly; and optical wedge means for enhancing the viewing angle of recessed photo sensors.

11. The system of claim 10 wherein:

said recessed photo sensors include the photo sensors associated with said base unit; and wherein said optical wedge means is associated with each recessed photo sensor of the base unit.

12. A full duplex, light wave communication system, comprising:

a base unit having a light transmitter and a light receiver;

a portable unit having a light transmitter and a light receiver;

the portable unit light transmitter and base unit light receiver being operative at a first center pulse frequency and having respective light pulse modulated photo emitters and light pulse detecting photo sensors;

said base unit light transmitter and portable unit light receiver being operative at a second center pulse frequency and having respective light pulse modulated photo emitters and light pulse detecting photo sensors;

said photo sensors and photo emitters respectively in the portable and the base units being mounted in assemblies, with means for isolating photo sensors from sensing near field radiation from a photo emitter associates with the same assembly;

with the photo emitters associated with said base unit being located in a recess within said base unit; and optical wedge means for enhancing the angle over which the recessed photo emitters radiate from said base unit.

13. A full duplex infrared telephone, comprising:

a base unit having an infrared transmitter and an infrared receiver;

a portable handset having an infrared transmitter and an infrared receiver;

the portable handset infrared transmitter and base unit infrared receiver being operative at a first center pulse frequency and having respective infrared pulse modulated photo emitters and infrared pulse detecting photo sensors;

said base unit infrared transmitter and handset infrared receiver being operative at a second center pulse frequency and having infrared pulse modulated photo emitters and infrared pulse detecting photo sensors; and means for establishing a closed loop between the respective infrared transmitter and infrared receiver of said portable handset and base unit and operative to control the photo intensity received by the base unit photo sensors and to cause said base unit transmitter to operate with a center frequency that is adjusted to correspond to any changes in the center frequency of said portable handset receiver.

14. The system of claim 13 and further including assemblies located at end locations of said handset and having in each assembly a plurality of said photo emitters and photo sensors.

15. The system of claim 13 and further including:

means for controlling a center frequency of said base unit infrared transmitter to correspond to a center frequency for said handset infrared receiver over a predetermined range of variations of said handset receiver center frequency.

16. The system of claim 15 and further including:

means associated with said base unit for coupling to and from a communication network and having an R-C balancing network for isolating signals coupled to and from said communication network.

17. The system of claim 16 wherein said coupling means includes a hybrid coupler comprising RC impedance dual and balancing circuitry between receiver and transmitter emulating inductor functions to provide a high degree of decoupling between said signals applied to and from said network.

* * * * *